United States Patent

[11] 3,555,327

| [72] | Inventor | Stanley M. Terry |
| | | Hampden, Mass. |
| [21] | Appl. No. | 810,245 |
| [22] | Filed | Mar. 25, 1969 |
| [45] | Patented | Jan. 12, 1971 |
| [73] | Assignee | AMBAC Industries, Incorporated |
| | | Springfield, Mass. |
| | | a corporation of New York |

[54] PERMANENT MAGNET ALTERNATOR WITH REGULATING MEANS
2 Claims, 5 Drawing Figs.

[52] U.S. Cl........................................... 310/168,
310/263
[51] Int. Cl.......................................... H02k 19/20
[50] Field of Search......................................... 310/168,
89, 156, 159, 166, 171, 177, 263, 46, 66

[56] References Cited
UNITED STATES PATENTS

| 2,802,959 | 8/1957 | Powers.......................... | 310/263 |
| 3,309,547 | 3/1967 | Woodward................... | 310/168 |
| 3,321,652 | 5/1967 | Opel............................ | 310/168 |
| 3,411,027 | 11/1968 | Rosenberg.................... | 310/156 |

*Primary Examiner*—Milton O. Hirshfield
*Assistant Examiner*—R. Skudy
*Attorney*—Howson and Howson ABSTRACT: An alternator with permanent magnet rotor having pole pieces is provided which has an output winding supported by a stator. At least one coil is employed which has a magnetic circuit including at least one of the pole pieces but independent of the permanent magnet so that the magnetic flux associated with the coil effects the magnetic flux from the permanent magnet passing through the one of the pole pieces.

PATENTED JAN 12 1971

INVENTOR:
STANLEY M. TERRY
BY Howson & Howson
ATTYS

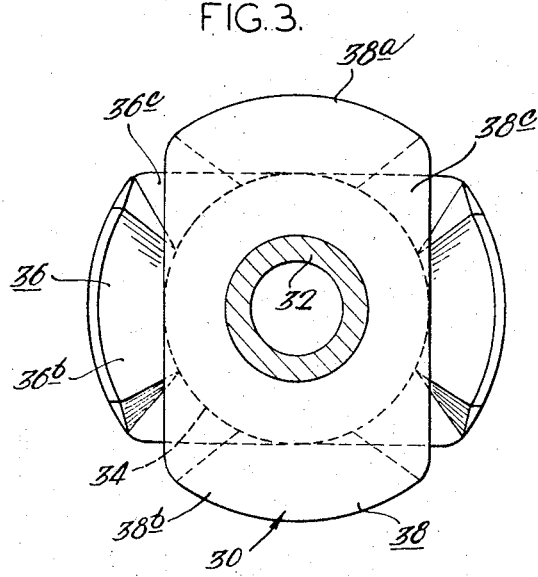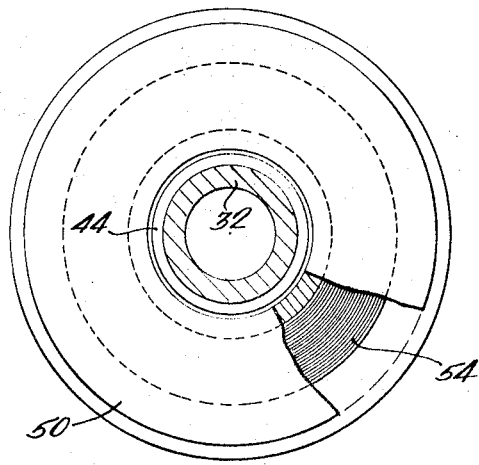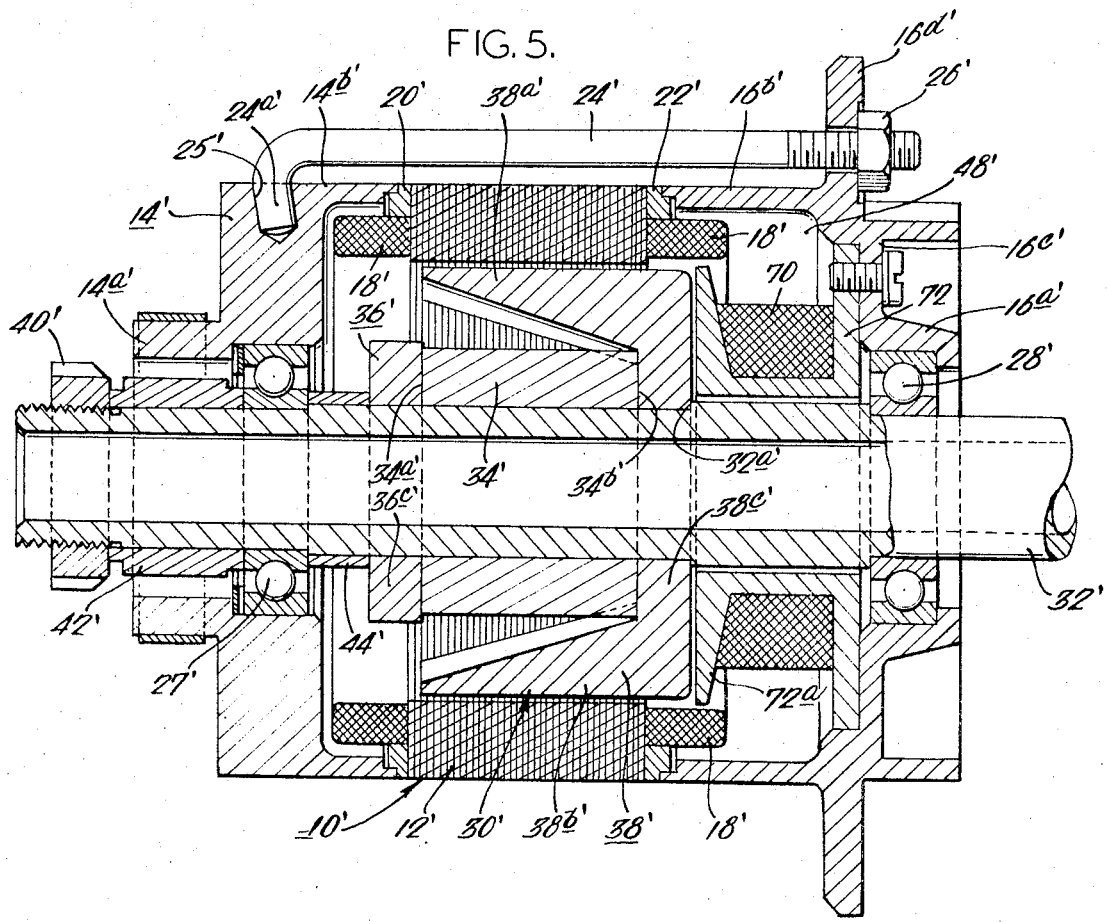

PERMANENT MAGNET ALTERNATOR WITH REGULATING MEANS

The present invention relates to an alternator and, more particularly, to an improved voltage regulating arrangement for an alternator employing permanent magnet flux-generating means.

In recent years there has been a continuing effort in the art of alternators to provide a suitable regulating means for controlling the output voltage of variable speed alternators. In alternators having both a wire wound stator and wire wound rotor, the excitation for the field can conveniently be controlled, and hence the output voltage, over a wide range of speeds by simply varying the current in the field generating windings. However, in alternators having permanent magnet flux-generating means on the rotor, which enables the alternator to be more economically manufactured, there has been no efficient and practical way of controlling or varying the magnetic flux provided by the permanent magnet. In the latter alternator systems, the output voltage is proportional to the alternator speed and the voltage will vary as the speed of the rotor varies.

In the prior art, systems have been designed to control the output voltage of variable speed alternators having permanent magnet flux-generating means. Some prior art systems have employed complicated speed sensitive couplings between the alternator rotor and the alternator driving member. Other prior art-regulating systems have employed electronic control circuits to block excess voltage and a regulating means which intermittently short circuits the alternator windings to electrical ground when an excess voltage condition exists. The last-mentioned arrangement may result in severe loading conditions on the alternator and also draws unusable power from the alternator driving member resulting in an inefficient system. Still other systems have employed a special winding on the stator which is employed to saturate the magnetic core on which the output induction winding is wound. Such systems employing special windings have been more expensive than desired to manufacture and may distort the wave shape of the output voltage so that the wave shape is distorted from a sine wave. Still other systems have employed a separate control winding which is provided to have its flux directly effect the magnetic flux of the permanent magnet by having the magnetic circuit for the control winding include the permanent magnet of the rotor. These latter systems adversely effect the permanent magnet causing a demagnetizing effect thereon.

Accordingly, it is an objective of the present invention to provide an efficient, reliable and simple means of controlling the output voltage of constant or variable speed, variable load and power factor alternators having permanent magnet flux-generating means. Also, the present invention is designed to provide close regulation of the output voltage. Furthermore, the present alternator is designed to have a low power input requirement for the regulating means which thereby permits a simple and inexpensive means of regulation. In an alternator of the type provided by the present invention, which employs permanent magnet flux-generating means, a simple self-contained alternator-regulator system is facilitated, requiring no external power for excitation and an output voltage is assured even with a load connected to the alternator output.

In accordance with the alternator of the present invention, there is provided a stator including a core of magnetic material with at least one output winding positioned thereon and a rotor rotatable relative to the stator. A pair of spaced pole pieces providing pole faces are supported by the rotor and a permanent magnet is supported by the rotor to produce magnetic flux in the hole pieces and polarize the pole pieces with opposite polarities. The output winding is cooperable with the magnetic flux from the pole pieces to have generated in the winding voltage pulses of alternatingly opposite polarity. A coil support member is supported by the stator adjacent one of the pair of pole pieces and a coil is supported by the coil support member, the coil being adapted to be connected to a direct current source of power. A magnetic circuit for the coil is provided, which is independent of the permanent magnet and includes the one of the pair of pole pieces and at least a portion of the stator, the coil being arranged to have its magnetic field effect the magnetic flux passing through the one of the pair of pole pieces to regulate the voltage produced in the output winding.

In this arrangement, the coil can be connected to the source of power to produce a magnetic flux to increase or boost the magnetic flux passing through the one of the pair of pole pieces, thereby producing an increased output voltage, or alternatively can be connected to the source of power to produce a magnetic flux to decrease or buck the magnetic flux passing through the one of the pair of pole pieces, thereby decreasing the output voltage generated in the output winding. In this manner, the permanent magnet alternator can have its output voltage easily and economically regulated and the sine wave output wave form of the voltage generated in the output winding is not distorted with the present regulating system. The present system enables the flux level of the permanent magnet rotor to be controlled directly by adding or subtracting magnetomotive force within the alternator, and this is accomplished by means of a relatively small and inexpensive auxiliary coil or coils positioned in a magnetic circuit in the alternator.

Preferably, the alternator of the present invention employs two coil support members with coils thereon. Each coil is associated with one of the pair of pole pieces to have its magnetic flux effect the magnetic flux passing through each of the pole pieces from the permanent magnet. The pole pieces are preferably axially spaced along the rotor with the permanent magnet positioned therebetween, each pole piece having axially extending portions providing interspaced pole faces around the periphery of the rotor. The magnetic circuit for each of the coils includes a different one of the pole pieces and portions of the stator. In this arrangement, the permanent magnet is effectively surrounded and shielded by the pole pieces to be well protected from any demagnetizing influence of the auxiliary control coils.

Depending on the degree of regulation desired, both coils can be connected to simultaneously boost the magnetic flux of the permanent magnet or, alternatively, both coils can be connected to simultaneously buck the magnetic flux from the permanent magnet through the pole pieces, which provides the maximum range of regulation.

Furthermore, in the alternator employing two coil support members, two coils can be wound on each coil support member in a bifilar manner, one coil on each support member being connected to increase or boost the magnetic flux from the permanent magnet and the other coil on each support member being connected to decrease or buck the flux from the permanent magnet.

For a better understanding of these and other features and advantages of the present invention, reference is made to the following drawings, in which:

FIG. 3 is a sectional view taken along line 3–3 of FIG. 2;

FIG. 4 is a sectional view taken along line 4–4 of FIG. 2; and

FIG. 5 is a sectional view of an alternator similarly viewed as in FIG. 2 but showing a modified form of the present invention.

Figure 1:
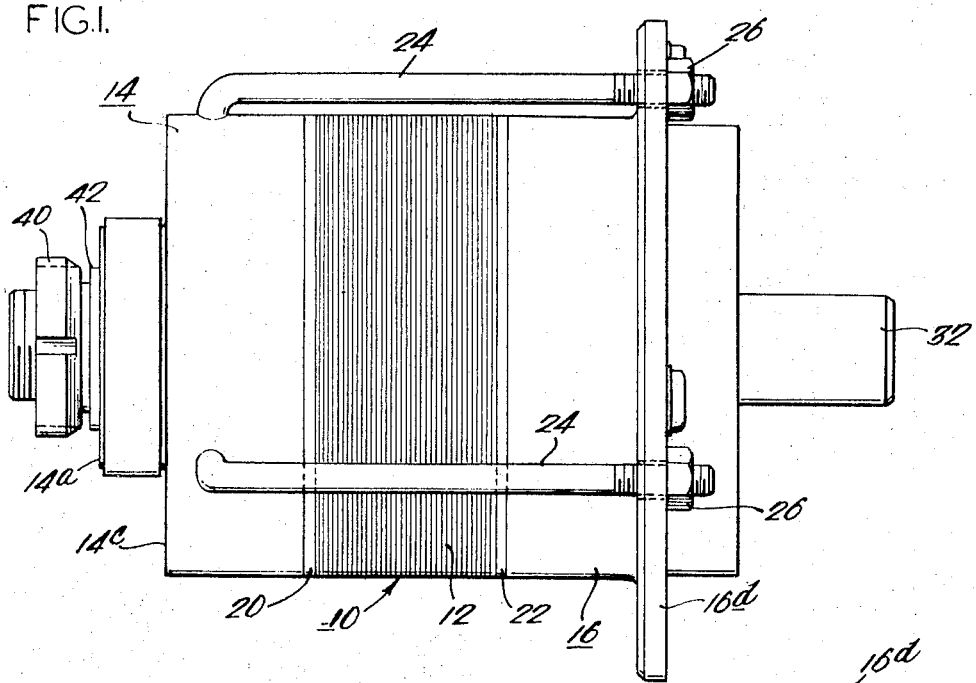
FIG. 1 is a side elevational view of an alternator in accordance with the present invention.
Figure 2:
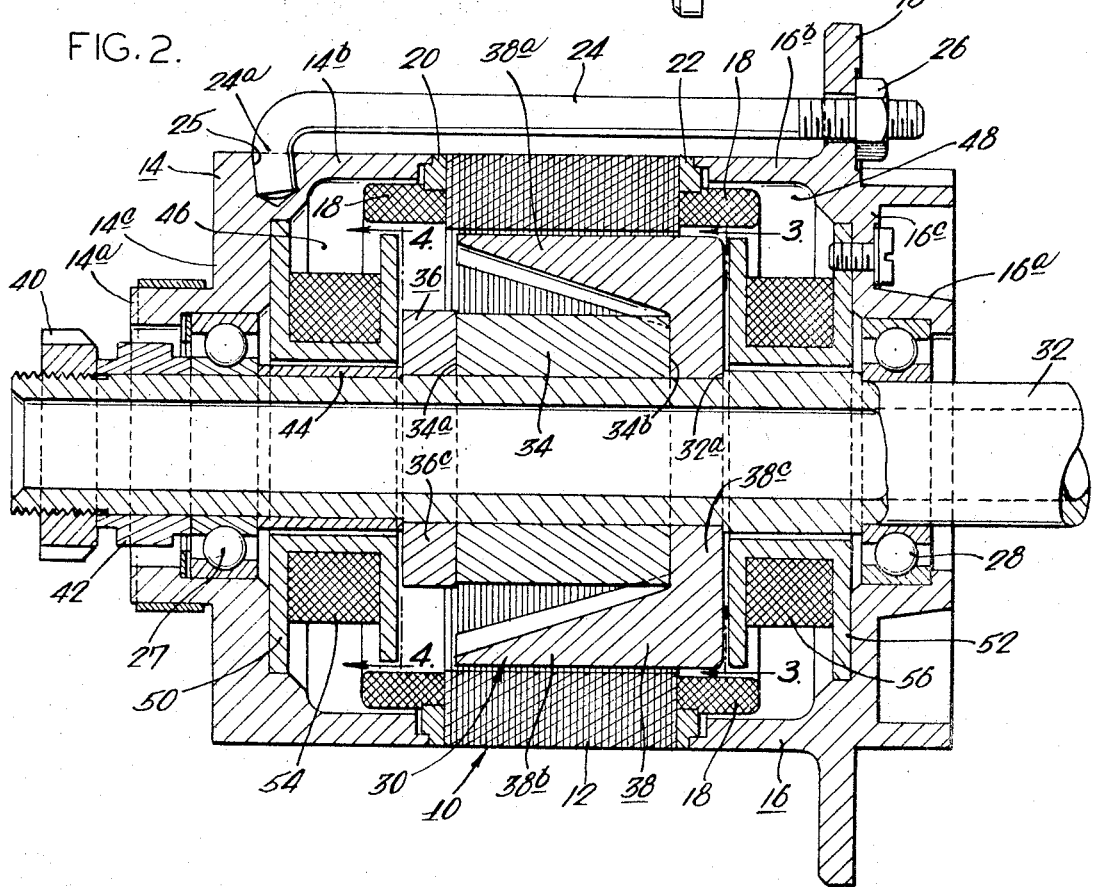
FIG. 2 is an enlarged sectional view of the alternator similarly viewed as in FIG. 1.

Referring to FIGS. 1 and 2, there is shown an alternator having a stator generally designated 10 including a core 12 and end caps 14 and 16 of magnetic material providing a housing. The core 12 is of the usual type comprising a stacked plurality of thin laminations of magnetic material and has at least one output winding generally designated 18 positioned thereon, as shown in FIG. 2. The end caps 14 and 16, which are generally cup-shaped in form, and core 12 have positioned therebetween annular spacers 20 and 22 and this structure is held together by three angular bolts 24 fastened between end cap 14 and end cap 16 and circumferentially spaced around the end caps. One end 24a of each of the bolts is bent and received in a recess 25 in the periphery of end cap 14 and each bolt extends to end cap 16 where its other end projects through an annular peripheral flange 16d of end cap 16 and receives a nut 26, as shown in FIG. 2. This construction clamps the spacers 20 and 22 and core 12 between the open end face of end cap 14 and the open end face of end cap 16. The end caps 14 and 16 are provided with central openings within axially extending, reduced diameter portions 14a and 16a, respectively, which house bearings generally designated 27 and 28, respectively, and permit a rotor generally designated 30 to rotate within the stator.

The rotor 30, as shown in FIGS. 2 and 3, comprises a tubular shaft rotatably supported by bearings 27 and 28 and adapted to receive a driving shaft. An annular permanent magnet 34 surrounds the shaft and is adapted to rotate with the shaft, which is made of nonmagnetic material such as stainless steel. The permanent magnet is axially polarized to provide pole faces 34a and 34b of opposite polarity. The rotor employs pole members of the Lundell type and the pole members comprise two generally U-shaped pole pieces 36 and 38, each having a pair of diametrically opposite axially extending portions providing pole faces 36a and 36b and 38a and 38b, respectively, connected by integral crossmembers 36c and 38c, have openings to receive shaft 32 and are arranged to embrace the pole faces 34a and 34b, respectively, of permanent magnet 34, as shown in FIGS. 2 and 3. In this arrangement with the permanent magnet 34 axially polarized, pole piece 36 is polarized with one polarity and pole piece 38 is polarized with the opposite polarity, the pole pieces providing axially extending interspaced poles of opposite polarity around the periphery of the rotor. Pole pieces 36 and 38 and magnet 34 are secured to shaft 32 and are held from axial movement by having a pole piece 38 abut an increased diameter shoulder 32a of shaft 32 and by having a spacer 42, the inner race of bearing 27 and spacer 44 positioned between pole piece 36 and lock nut 40 threaded on the end of the shaft, as shown in FIG. 2.

The axially extending portions 14b and 16b of end caps 14 and 16, respectively, extend a sufficient distance to provide annular compartments 46 and 48 within the housing between pole pieces 36 and 38 and end caps 14 and 16, respectively. Annular coil support members 50 and 52 are supported within compartments 46 and 48, respectively, adjacent opposite axial ends of the magnetic structure of the rotor and surround the rotor shaft 32. More specifically, the coil support members 50 and 52 are positioned axially adjacent crossmembers 36c and 38c, respectively, of the pole pieces 36 and 38, respectively. Coil support members 50 and 52 comprise spools of magnetic material on which coils 54 and 56, respectively, are wound, as shown in FIGS. 2 and 4. Spool 50 is supported by end cap 14 and is fixed to the end cap, as by screws, and a small air gap is provided between spool 50 and pole piece 36, as shown in FIG. 2. Similarly, spool 52 is supported by end cap 16 and is secured to the end cap, as by screws, and a small air gap is provided between spool 52 and pole piece 38. The coils 54 and 56 are adapted to be connected to the same or separate direct current sources of power (not shown) by suitable conductors. The connection of the coils to the same or separate sources of power will be discussed more fully hereinafter.

In this arrangement, the magnetic circuit for the flux created by current flowing through coil 54 comprises pole piece 36, pole faces 36a and 36b, core 12, portions 14b and 14c of end cap 14 and spool 50. Similarly, the magnetic circuit for the flux created by current flowing through coil 56 comprises pole piece 38, pole faces 38a and 38b, core 12, portions 16b and 16c of end cap 16 and spool 52. The direction of the flow of flux associated with each of the coils 54 and 56 is dependent upon the direction of flow of current through the coils from the direct current source or sources to which they are connected. The connections of the coils to the same or separate direct current sources depends upon the direction of current flow desired and amount of regulation of the alternator output required for the particular application in which it is employed. For example, if the output voltage of the alternator is desired to be substantially increased, coils 54 and 56 would be wound in a suitable direction and could be connected to the same direct current source of power so that the magnetic flux associated with coil 54 would pass through the pole piece 36 and out the pole faces 36a and 36b to core 12 and through portions 14b and 14c of end cap 14 and back to coil support 50; and, similarly, for coil 54, the flux path would pass through pole piece 38 and pole faces 38a and 38b to core 12, through portions 16b and 16c of end cap 16 and back to coil support 52. In this instance, both coils would be connected to have their flux effect the magnetic flux passing through the pole pieces from the permanent magnet to increase or boost the overall magnetic flux emanating from the rotor to induce a greater output voltage in output winding 18 on stator core 12.

In like manner, for a particular application it may be desired to decrease the effect of the magnetic flux produced by the permanent magnet to thereby decrease the output voltage of the alternator. In this instance, coils 54 and 56 would be connected to a source of direct current power so that the flux associated with coil 54 would pass through portions 14c and 14b of end cap 14 to core 12, across the air gap to pole faces 36a and 36b, through the pole piece 36 and back to the coil support 50; and, similarly, the flux associated with coil 56 would pass through portions 16c and 16b of end cap 16 to core 12, across the air gap to pole faces 38a and 38b, through pole piece 38 and back to coil support 52. In this last example, both coils 54 and 56 are arranged to have their magnetic flux act to decrease or buck the effect of the magnetic flux passing through each of the pole pieces created by the permanent magnet, thereby decreasing the output voltage induced in output winding 18 of the alternator. Depending on the direction the coils are wound on the spools and the direction of passage of the direct current therethrough, both coils could be connected to the same or different sources of power as required for the control desired.

It should also be obvious that one coil could be connected to a source of power to increase the magnetic flux from the permanent magnet through one of the pole pieces and the other coil connected to the same or a different source of power to decrease the effect of the magnetic flux produced by the permanent magnet through the other one of the pole pieces. Of course, it may be desirable to connect the coils through switches to the same or separate direct current sources of power so that, depending on the load supplied by the alternator, if variations in output voltage were required, either or both coils could be connected to increase and/or decrease or have no effect on the magnetic flux produced by the permanent magnet and conducted through the pole pieces. For the maximum range of regulation, both coils are connected to simultaneously increase or boost the magnetic flux from the magnet or alternatively decrease or buck the magnetic flux from the magnet to control the output voltage of the alternator.

With the present alternator, effective control of the alternating current output is obtained through use of the auxiliary coils 54 and 56 provided in the alternator housing. The control is achieved by a simple and inexpensive arrangement of coils supported by the stator. The coils provide control without deformation of the output voltage wave form of output winding 18. Due to the low power input requirement to the auxiliary coils of the present invention, a simple and low-cost solid-state regulator circuit can be employed therewith to maintain a constant voltage output in output winding 18, such regulating circuits being apparent to those skilled in the art. When employing both coils to simultaneously boost or simultaneously buck the magnetic flux of the magnet, the coils can be connected to a source of power through a boost-buck regulator to provide a large range of regulation for controlling the output voltage of the alternator.

It will be apparent to those skilled in the art that the capabilities of the present alternator in regulating the output voltage may be varied by varying the number of auxiliary regulating coils wound on each coil support member or bobbin. For example, since the effective change in output voltage of the alternator, relative to the ampere-turns of the regulating coils, decreases with increasing regulating current to the coils due to iron saturation, an excellent regulating range for the output voltage can be achieved by winding both a boost coil and a buck coil on each bobbin. The boost coil is employed to increase (boost) the magnetic flux produced by the permanent magnet and the buck coil is employed to decrease (buck) the magnetic flux from the magnet. Each bucking coil is preferably wound in a bifilar manner with the associated boost coil on each bobbin, and, preferably, the buck coil is of smaller size wire to reduce its effective ampere-turns. In this arrangement, the bucking coils can be connected directly to a source of direct current power without a separate regulator in their circuit, and the boost coils are connected in a regulator circuit which senses the output voltage of the alternator. This arrangement increases the regulating range of the output voltage of the alternator without requiring a more expensive boost-buck regulator in the circuit of the auxiliary coils. Also, in this arrangement there is a relatively minor increase in the size of the coils wound on the bobbin, since the buck coil windings occupy the space between the larger boost coil windings of the bifilar arrangement. Thus, when no boost current is required, the effect of the bucking coil on the magnetic flux of the magnet is relatively large, but under conditions when high boost current is required, the effect of the magnetic flux of the buck coils is very small. Therefore, if size of the alternator is not a significant factor, the boost and buck coils can be designed such that the maximum voltage regulation range is achieved without the more complicated and expensive boost-buck regulator in the auxiliary coil circuit which is otherwise usually used in the one coil per bobbin arrangement.

It should be appreciated that a single auxiliary coil, as shown in FIG. 5, can be employed with equally good maintenance of the output wave form, although the effective range of control is less than with the two auxiliary coil arrangement shown in FIG. 2. In the modified alternator of FIG. 5, parts of the stator and rotor similar to those of the alternator of FIG. 2 are identified by the same number designators with the addition of primes thereto. The primary difference lies in the use of a single auxiliary coil on one side of the rotor, rather than an auxiliary coil on each side of the rotor, as shown in FIG. 2. In the alternator of FIG. 5, the axially extending portion 14b' of end 14 has been foreshortened and is not adapted to receive a spool with an auxiliary coil.

In the alternator of FIG. 5, only one auxiliary coil 70 is employed and is wound on bobbin or spool 72 of magnetic material which is positioned in annular compartment 48' around rotor shaft 32' between end cap 16' and pole piece 38'. The spool 72 is fixed to end cap 16', as by screws, and has been made larger than the spools shown in FIG. 2. In this instance, spool 72 has one side rim 72a, which is adjacent pole piece 38', tapered to provide an increasing area to receive more turns of coil 70 toward the periphery of the spool, and thereby increase the effective ampere-turns near the inner diameter of the spool adjacent pole piece 38'. The coil 70 in FIG. 5 would be connected to a suitable source of direct current power (not shown) by means of suitable electrical connectors.

The magnetic circuit for coil 70 would include spool 72, pole piece 38' and pole faces 38a' and 38b', core 12' and end cap 16'. With this construction, coil 70 could be connected to a source of power to either increase the effect of the magnetic flux passing through pole piece 38' or decrease the effect of the magnetic flux passing through pole piece 38' from permanent magnet 34'. In this embodiment of the alternator, the control coil requires low input power and can, therefore, have a simple solid-state regulator employed therewith for providing a constant output voltage of the alternator over a predetermined range.

It should be appreciated that the alternator of the present invention provides a convenient and simple arrangement for controlling and regulating the output voltage of a variable speed alternator having permanent magnet flux-generating means. The regulating arrangement of the present invention achieves control of the output voltage without deformation of the wave form of the alternating voltage output. The regulating system of the present system provides a reliable means for regulating the output voltage and is inexpensive to manufacture and assemble. The present invention provides a system which has long been desired in the art for efficiently controlling or varying the magnetic flux in an alternator having a permanent magnet rotor.

While the present invention has been described with particular reference to specific embodiments in the interest of complete definiteness, it may be embodied in a large variety of forms diverse from the ones specifically shown and described without departing from the scope and spirit of the invention as defined by the appended claims.

I claim:
1. An alternator comprising:
   a stator providing a housing including a core of magnetic material and at least one output winding positioned thereon;
   a rotor rotatable relative to the stator, the stator housing supporting the rotor therein;
   a pair of spaced pole pieces providing pole faces supported by the rotor;
   a permanent magnet supported by the rotor to produce magnetic flux in the pole pieces and adapted to polarize the pair of pole pieces with opposite polarities;
   said at least one output winding being cooperable with the magnetic flux from the pole pieces to generate voltage pulses of alternating opposite polarity;
   a coil support member supported by the stator adjacent one of the pair of pole pieces;
   a coil supported by the coil support member and adapted to be connected to a direct current source of power; and
   a magnetic circuit for the coil independent of the permanent magnet and including the one of the pair of pole pieces and at least a portion of the stator housing, the coil being arranged to have its magnetic flux effect the magnetic flux passing through the one of the pair of pole pieces.

2. The alternator of claim 1 in which the pole pieces are axially spaced along the rotor with the permanent magnet therebetween, and the coil support member is supported between the one of the pole pieces and the housing.

UNITED STATES PATENT OFFICE
CERTIFICATE OF CORRECTION

Patent No. 3,555,327          Dated  January 12, 1971

Inventor(s) Stanley M. Terry

It is certified that error appears in the above-identified patent and that said Letters Patent are hereby corrected as shown below:

Column 1, line 51, after "output voltage." insert --wit deformation of the wave shape of the output voltage.--.
Column 1, line 66, "hole" should read --pole--.
Column 3, line 25, after "38c," insert --respectively. cross members 36c and 38c--.

Signed and sealed this 20th day of April 1971.

(SEAL)
Attest:

EDWARD M. FLETCHER, JR.         WILLIAM E. SCHUYLER, JR.
Attesting Officer                 Commissioner of Patents